(12) United States Patent
Song

(10) Patent No.: US 9,781,368 B2
(45) Date of Patent: Oct. 3, 2017

(54) RAMP VOLTAGE GENERATOR, IMAGE SENSING DEVICE INCLUDING THE SAME AND METHOD FOR DRIVING THE IMAGE SENSING DEVICE

(71) Applicant: SK hynix Inc., Gyeonggi-do (KR)

(72) Inventor: Jung-Eun Song, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/084,161

(22) Filed: Mar. 29, 2016

(65) Prior Publication Data

US 2017/0127001 A1 May 4, 2017

(30) Foreign Application Priority Data

Oct. 28, 2015 (KR) .................. 10-2015-0150146

(51) Int. Cl.
*H04N 5/369* (2011.01)
*G05F 3/16* (2006.01)
*H04N 5/378* (2011.01)

(52) U.S. Cl.
CPC .............. *H04N 5/3698* (2013.01); *G05F 3/16* (2013.01); *H04N 5/378* (2013.01)

(58) Field of Classification Search
CPC ......... H04N 5/3698; H04N 5/378; G05F 3/16
See application file for complete search history.

(56) References Cited

U.S. PATENT DOCUMENTS

| 6,670,904 | B1 * | 12/2003 | Yakovlev | H03M 1/144 341/165 |
| 7,423,570 | B2 * | 9/2008 | Asayama | H03M 1/1014 341/139 |
| 2015/0008308 | A1 * | 1/2015 | Huang | H03M 1/14 250/208.1 |

FOREIGN PATENT DOCUMENTS

KR 1020140093262 7/2014

OTHER PUBLICATIONS

Minkyu Song et al., A Two-Step AD Conversion and Column Self Calibration Technique for Low Noise CMOS Image Sensor, Jul. 4, 2014, Sensors, Sensor 2014 ISSN 1424-8220, 11825-00843.*

* cited by examiner

*Primary Examiner* — Padma Haliyur
(74) *Attorney, Agent, or Firm* — IP & T Group LLP

(57) ABSTRACT

A ramp voltage generator may include: a correction block suitable for generating a slope correction signal for first and second periods based on a period signal for distinguishing the periods; a common bias voltage generation block suitable for generating a common bias voltage based on the slope correction signal and a source bias voltage; and a first ramp voltage generation block suitable for generating a first ramp voltage having a predetermined slope during the first period based on the common bias voltage and a first ramp group control signal; and a second ramp voltage generation block suitable for generating ramp voltages having the predetermined slope during the second period based on the common bias voltage and a second ramp group control signal.

11 Claims, 7 Drawing Sheets

RAMP VOLTAGE GENERATOR, IMAGE SENSING DEVICE INCLUDING THE SAME AND METHOD FOR DRIVING THE IMAGE SENSING DEVICE

CROSS-REFERENCE TO RELATED APPLICATIONS

The present application claims priority of Korean Patent Application No. 10-2015-0150146, filed on Oct. 28, 2015, which is incorporated herein by reference in its entirety.

BACKGROUND

1. Field

Exemplary embodiments of the present invention relate to a semiconductor design technology, and more particularly, to a ramp voltage generator, an image sensing device including the same and method for driving the image sensing device.

2. Description of the Related Art

Image sensing devices capture images using photosensitive properties of semiconductors. Image sensing devices are often classified into charge-coupled device (CCD) image sensors and complementary metal-oxide semiconductor (CMOS) image sensors. CMOS image sensors allow for both analog and digital control circuits to be directly realized on a single integrated circuit (IC), making CMOS image sensors the most widely used type of image sensor.

Electronic devices, such mobile phones may be fabricated with built-in image sensing devices. The image sensing devices need to perform high speed operations to improve the overall performance of the mobile apparatus. This has resulted in many specialized technologies being developed for image sensing devices. Particularly, technologies for reducing analog-to-digital converter (hereinafter, referred to as "ADC") readout times of image sensing devices have being recently proposed. For example, a 2-step ADC developed from a single-slope ADC has been proposed. The single-slope ADC requires a clock with a cycle of "$2^{10}=1024$" in order to output a digital signal of 10 bits, whereas the 2-step ADC requires a clock with a cycle of "$2^3+2^7=136$" by outputting 3 bits of the digital signal using a coarse clock and outputting the other 7 bits of the digital signal using a fine clock. Ideally, the readout time could be reduced by a ratio of "136/1024". Since the coarse clock has a frequency lower than that of the fine clock in order to ensure the settling time of the coarse clock, the readout time is longer than the ideal readout time. However, the readout time of the 2-step ADC may be effectively reduced compared with the readout time of the single-slope ADC. In addition, since the 2-step ADC may be realized in a small circuit area, it is generally preferred as a technology that can be applied to image sensing devices having a high number of pixels and operating at high speed.

The 2-step ADC uses a coarse ramp voltage corresponding to the coarse clock and a fine ramp voltage corresponding to the fine clock. For example, the 2-step ADC may output a digital signal of 3 bits corresponding to a voltage level of a pixel signal (i.e., an analog signal) based on the coarse ramp voltage having a predetermined slope, and then may output a digital signal of 7 bits corresponding to the voltage level of the pixel signal based on the fine ramp voltage having the predetermined slope. Typically, an image sensing device includes a ramp voltage generator for generating the coarse ramp voltage and the fine ramp voltage.

FIG. 1 is a diagram illustrating a conventional ramp voltage generator.

Referring to FIG. 1, the conventional ramp voltage generator includes a source current generation block 11, a coarse ramp voltage generation block 13, and a fine ramp voltage generation block 15.

The source current generation block 11 generates a first source current I1 in response to a first bias voltage VNB and a second bias signal VPB corresponding to the first source current I1.

For example, the source current generation block 11 includes a first sinking section N1 and a first sourcing section P0. The first sinking section N1 is coupled between an output terminal of the second bias voltage VPB and a ground voltage terminal, and sinks the first source current I1 in response to the first bias voltage VNB. For example, the first sinking section N1 includes a NMOS transistor having a gate coupled to an input terminal of the first bias voltage VNB, and a drain and a source coupled between the output terminal of the second bias voltage VPB and the ground voltage terminal. The first sourcing section P0 is coupled between a power supply voltage terminal and the output terminal of the second bias voltage VPB, and sources the source current I1 in response to the second bias voltage VPB. For example, the first sourcing section P0 includes a PMOS transistor having a gate and a drain coupled to the output terminal of the second bias voltage VPB, and a source coupled to the power supply voltage terminal.

The coarse ramp voltage generation block 13 generates a first mirror current I2 varied by a coarse operating unit, for example, corresponding to 128 least significant bits (LSB), in response to the second bias voltage VPB and first to $X^{th}$ coarse ramp control signals CR_CTRL<1:X>, and generates a coarse ramp voltage VCR based on the first mirror current I2.

For example, the coarse ramp voltage generation block 13 includes first mirroring sections P1 to PX, first switching sections SW1 to SWX, and a first resistor section R_CR. The first mirroring sections P1 to PX are coupled between the power supply voltage terminal and first to $X^{th}$ mirroring nodes MN1 to MNX, and resource the first mirror current I2 in response to the second bias voltage VPB. For example, the first mirroring sections P1 to PX include first to $X^{th}$ PMOS transistors respectively having gates coupled to an input terminal of the second bias voltage VPB and sources and drains coupled between the power supply voltage terminal and the first to $X^{th}$ mirroring nodes MN1 to MNX. The first switching sections SW1 to SWX are coupled between the first to $X^{th}$ mirroring nodes MN1 to MNX and an output terminal of the coarse ramp voltage VCR, and generate the first mirror current I2 decreased by the coarse operating unit during a coarse conversion period in response to the first to $X^{th}$ coarse ramp control signals CR_CTRL<1:X>. For example, the first switching sections SW1 to SWX include first to $X^{th}$ switching elements which are sequentially open during the coarse conversion period in response to the first to $X^{th}$ coarse ramp control signals CR_CTRL<1:X>. The first resistor section R_CR may be coupled between the output terminal of the coarse ramp voltage VCR and the ground voltage terminal. For example, the first resistor section R_CR includes a resistance element.

The fine ramp voltage generation block 15 generates a second mirror current I3 varied by a fine operating unit, for example, corresponding to 1 LSB, in response to the second bias voltage VPB and first to $Z^{th}$ fine ramp control signals FR_CTRL<1:Z>, and generates a fine ramp voltage VFR based on the second mirror current I3.

For example, the fine ramp voltage generation block 15 includes second mirroring sections PX+1 to PX+Z, second switching sections SW11 to SW1Z, and a second resistor section R_FR. The second mirroring sections PX+1 to PX+Z are coupled between the power supply voltage terminal and first to $Z^{th}$ mirroring nodes MNX+1 to MNX+Z, and resource the second mirror current I3 in response to the second bias voltage VPB. For example, the second mirroring sections PX+1 to PX+Z include first to $Z^{th}$ PMOS transistors respectively having gates coupled to the input terminal of the second bias voltage VPB and sources and drains coupled between the power supply voltage terminal and the first to $Z^{th}$ mirroring nodes MNX+1 to MNX+Z. The second switching sections SW11 to SW1Z are coupled between the first to $Z^{th}$ mirroring nodes MNX+1 to MNX+Z and an output terminal of the fine ramp voltage VFR, and generate the second mirror current I3 increased by the fine operating unit during a fine conversion period in response to the first to $Z^{th}$ fine ramp control signals FR_CTRL<1:Z>. For example, the second switching sections SW11 to SW1Z include first to $Z^{th}$ switching elements which are sequentially closed during fine conversion period in response to the first to $Z^{th}$ fine ramp control signals FR_CTRL<1:Z>. The second resistor section R_FR may be coupled between the output terminal of the fine ramp voltage VFR and the ground voltage terminal. For example, the second resistor section R_FR includes a resistance element.

In the conventional image sensing device, a mismatch may be exist between the coarse ramp voltage generation block 13 and the fine ramp voltage generation block 15. For example, a mismatch in a fabrication process may occur between the first to $X^{th}$ PMOS transistors included in the first mirroring sections P1 to PX and the first to $Z^{th}$ PMOS transistors included in the second mirroring sections PX+1 to PX+Z, or a mismatch in the fabrication process may occur between load resistors of the coarse ramp voltage generation block 13 and the fine ramp voltage generation block 15.

For this reason, when a mismatch occurs between the coarse ramp voltage generation block 13 and the fine ramp voltage generation block 15, a mismatch between the coarse ramp voltage VCR and the fine ramp voltage VFR may occur. In this case, a circuit using the coarse ramp voltage VCR and the fine ramp voltage VFR, for example, the 2-step ADC, outputs a digital signal corresponding to a missed code (i.e., an erroneous code). FIGS. 2A and 2B are graphs illustrating the relation between the range of an analog signal (i.e., ADC range) and a corresponding digital signal (i.e., count code) to which the 2-step ADC may convert the analog signal. For example, when the slope of the fine ramp voltage VFR is lower than that of the coarse ramp voltage VCR, a linearity error may occur as illustrated in FIG. 2A. When the slope of the fine ramp voltage VFR is higher than that of the coarse ramp voltage VCR, a linearity error may occur as illustrated FIG. 2b.

Therefore, when the linearity error occurs, the 2-step ADC outputs a digital signal corresponding to a missed code in converting an analog signal.

SUMMARY

Various embodiments of the present invention are directed to a ramp voltage generator that may compensate for a mismatch between a coarse ramp voltage and a fine ramp voltage, an image sensing device including the ramp voltage generator, and a method for driving the image sensing device.

According to an embodiment of the present invention, a ramp voltage generator may include: a correction block suitable for generating a slope correction signal for first and second periods based on a period signal for distinguishing the periods; a common bias voltage generation block suitable for generating a common bias voltage based on the slope correction signal and a source bias voltage; and a first ramp voltage generation block suitable for generating a first ramp voltage having a predetermined slope during the first period based on the common bias voltage and a first ramp group control signal; and a second ramp voltage generation block suitable for generating ramp voltages having the predetermined slope during the second period based on the common bias voltage and a second ramp group control signal.

The correction block may include: first and second correction units suitable for storing first and second group correction signals, respectively; and a slope correction unit suitable for outputting the first group correction signal or the second group correction signal as the slope correction signal based on the period signal.

The common bias voltage generation block may include: a sinking section coupled between an output terminal of the common bias voltage and a low voltage terminal, and suitable for sinking a first source current based on the source bias voltage; a plurality of second sourcing sections coupled between a high voltage terminal and a plurality of first sourcing nodes, respectively, and suitable for sourcing the first source current based on the common bias voltage; and a plurality of second switching sections coupled between the respective first sourcing nodes and the output terminal of the common bias voltage, and suitable for selectively switching based on the slope correction signal.

According to another embodiment of the present invention, an image sensing device may include: a pixel array suitable for generating an image signal; an analog-to-digital converter suitable for generating a digital signal corresponding to the image signal based on a coarse ramp voltage and a fine ramp voltage; and a ramp voltage generator suitable for generating the coarse ramp voltage during a coarse conversion period and the fine ramp voltage during a fine conversion period based on a coarse conversion period signal, a fine conversion period signal, a source bias voltage, a coarse ramp group control signal, and a fine ramp group control signal, and for correcting at least one of a slope of the coarse ramp voltage and a slope of the fine ramp voltage.

The ramp voltage generator may include: a correction block suitable for generating a slope correction signal previously set for each of the coarse and fine conversion periods, based on the coarse conversion period signal and the fine conversion period signal; a common bias voltage generation block suitable for generating a common bias voltage based on the slope correction signal and the source bias voltage; a coarse ramp voltage generation block suitable for generating the coarse ramp voltage having a predetermined slope during the coarse conversion period based on the common bias voltage and the coarse ramp group control signal; and a fine ramp voltage generation block suitable for generating the fine ramp voltage having the predetermined slope during the fine conversion period based on the common bias voltage and the fine ramp group control signal.

The correction block may include: a coarse correction unit suitable for storing a coarse group correction signal; a fine correction unit suitable for storing a fine group correction signal; and a slope correction unit suitable for outputting the coarse group correction signal or the fine group correction signal as the slope correction signal based on the coarse conversion period signal and the fine conversion period signal.

The common bias voltage generation block may include: a sinking section coupled between an output terminal of the common bias voltage and a low voltage terminal, and suitable for sinking a first source current based on the source bias voltage; a plurality of second sourcing sections coupled between a high voltage terminal and a plurality of first sourcing nodes, respectively, and suitable for sourcing the first source current based on the common bias voltage; and a plurality of second switching sections coupled between the respective first sourcing nodes and the output terminal of the common bias voltage, and suitable for selectively switching based on the slope correction signal.

According to another embodiment of the present invention, a method for driving an image sensing device may include: setting a coarse correction group signal corresponding to a coarse conversion period and a fine correction group signal corresponding to a fine conversion period; generating a common bias voltage having a first voltage level based on the coarse correction group signal and a source bias voltage during the coarse conversion period, and generating a coarse ramp voltage having a predetermined slope based on the common bias voltage; and generating the common bias voltage having a second voltage level based on the fine correction group signal and the source bias voltage during the fine conversion period, and generating a fine ramp voltage having the predetermined slope based on the common bias voltage.

The setting of the coarse correction group signal and the fine correction group signal may include storing the coarse correction group signal and the fine correction group signal previously set through a test or a simulation.

The first voltage level and the second voltage level are identical to each other.

The first voltage level and the second voltage level are different from each other.

DETAILED DESCRIPTION

Figure 1:
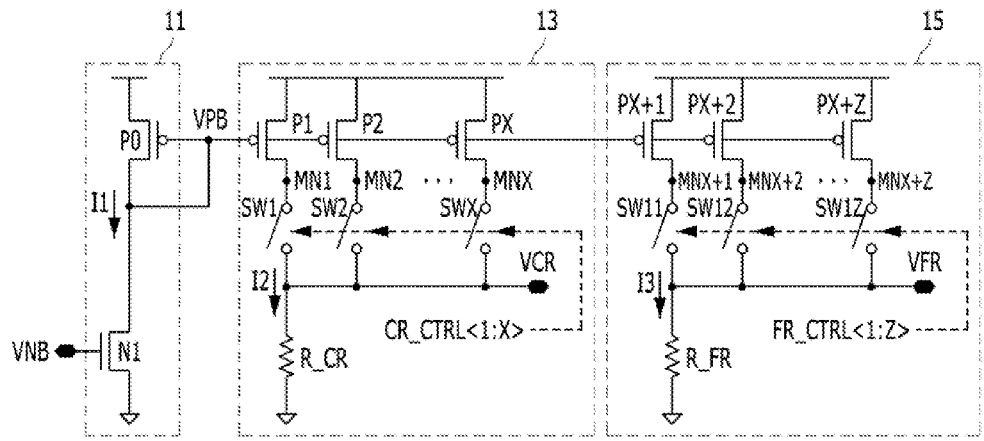
FIG. 1 is a diagram illustrating a conventional ramp voltage generator.
Figure 2A:
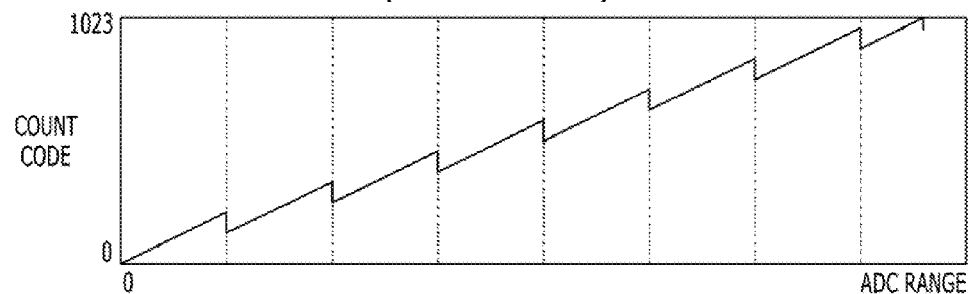
FIGS. 2A and 2B are graphs for describing an operation of the ramp voltage generator shown in FIG. 1.
Figure 2B:
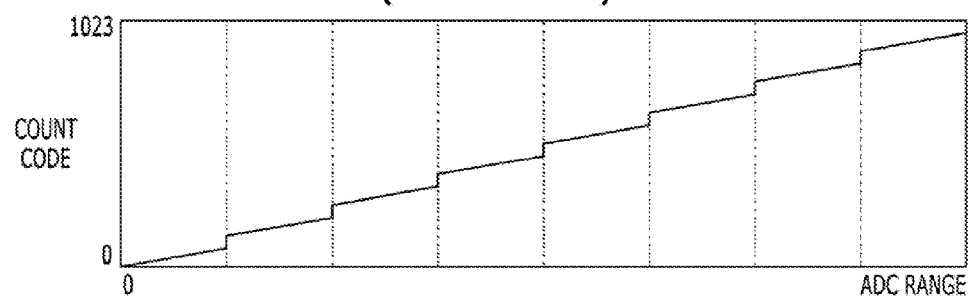

Various embodiments of the present invention are described below in more detail with reference to the accompanying drawings. The present invention may, however, be embodied in different forms and should not be construed as limited to the embodiments set forth herein. Rather, these embodiments are provided so that this disclosure is thorough and complete, and fully convey the present invention to those skilled in the art. Throughout the disclosure, like reference numerals refer to like parts throughout the various figures and embodiments of the present invention.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises," "comprising," "includes" and/or "including" when used in this specification, indicate the presence of stated features, but do not preclude the presence or addition of one or more other non-stated features. As used herein, the term "and/or" indicates any and all combinations of one or more of the associated listed items.

Figure 3:
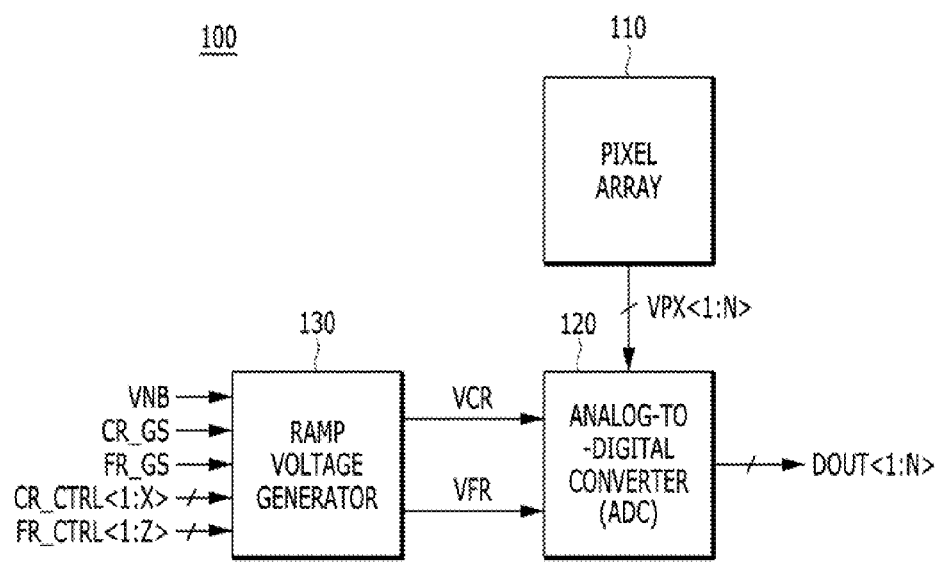
FIG. 3 is a block diagram illustrating an image sensing device according to an embodiment of the present invention.

Referring now to FIG. 3 an image sensing device 100 is provided, according to an embodiment of the present invention.

The image sensing device 100 may include a pixel array 110, an analog-to-digital converter (ADC) 120, and a ramp voltage generator 130.

The pixel array 110 may include N*M pixels (not illustrated) arranged in a row direction and a column direction, where N and M are natural numbers. The pixel array 110 may output sequentially first to $N^{th}$ pixel signals VPX<1:N> in units of rows M times.

The analog-to-digital converter 120 may generate first to $N^{th}$ digital signals DOUT<1:N> corresponding to the first to $N^{th}$ pixel signals VPX<1:N> based on a coarse ramp voltage VCR and a fine ramp voltage VFR. For example, the analog-to-digital converter 120 may be or include a 2-step ADC.

The ramp voltage generator 130 may generate the coarse ramp voltage VCR and the fine ramp voltage VFR having the same slope in response to a source bias voltage VNB, a coarse conversion period signal CR_GS, a fine conversion period signal FR_GS, first to $X^{th}$ coarse ramp control signals CR_CTRL<1:X>, and first to $Z^{th}$ fine ramp control signals FR_CTRL<1:Z>. Hereinafter, the first to $X^{th}$ coarse ramp control signals CR_CTRL<1:X> are referred to as "coarse ramp group control signals CR_CTRL<1:X>", and the first to $Z^{th}$ fine ramp control signals FR_CTRL<1:Z> are referred to as "fine ramp group control signals FR_CTRL<1:Z>".

Although not illustrated, the coarse conversion period signal CR_GS may be a control signal used for generating the coarse ramp group control signals CR_CTRL<1:X>. The fine conversion period signal FR_GS may be a control signal used for generating the fine ramp group control signals FR_CTRL<1:Z>.

Figure 4:
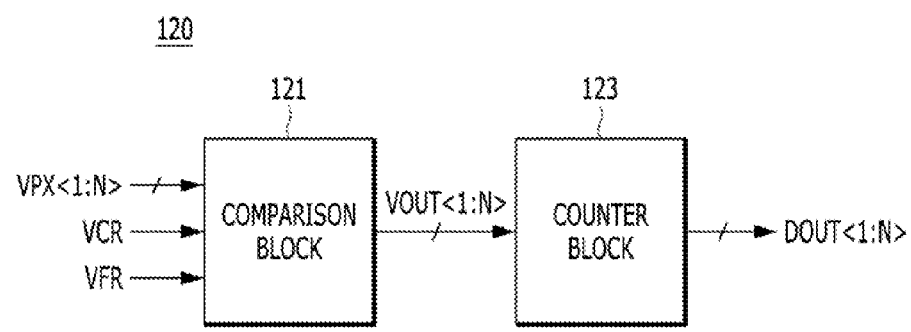
FIG. 4 is a detailed diagram of an analog-to-digital converter shown in FIG. 3, according to an embodiment of the invention.

FIG. 4 is a detailed diagram of the analog-to-digital converter 120 shown in FIG. 3, according to an embodiment of the invention.

Referring to FIG. 4, the analog-to-digital converter 120 may include a comparison block 121 and a counter block 123.

The comparison block 121 may include first to $N^{th}$ comparison units (not illustrated) corresponding to the first to $N^{th}$ pixel signals VPX<1:N>. The first to $N^{th}$ comparison units may respectively receive a single pixel signal among the first to $N^{th}$ pixel signals VPX<1:N>, and receive the coarse ramp voltage VCR and the fine ramp voltage VFR in common. The first to $N^{th}$ comparison units may compare respective pixel signals with the coarse ramp voltage VCR during a coarse conversion period, compare the respective pixel signals with the fine ramp voltage VFR during a fine conversion period, and generate first to $N^{th}$ comparison result signals VOUT<1:N> based on comparison results during the coarse and fine conversion periods. For example, the first comparison unit may compare the first pixel signal VPX<1> with the coarse ramp voltage VCR, and may perform zero crossing for the first comparison result signal VOUT<1> when the first pixel signal VPX<1> is substantially equal to the coarse ramp voltage VCR as a result of the comparison. Based on the comparison result of the first pixel signal VPX<1> and the coarse ramp voltage VCR, the first comparison unit may compare the first pixel signal VPX<1> with the fine ramp voltage VFR, and may perform zero crossing for the first comparison result signal VOUT<1> again when the first pixel signal VPX<1> is substantially equal to the fine ramp voltage VFR as a result of the comparison.

The counter block 123 may include first to $N^{th}$ counting units (not illustrated) corresponding to the first to $N^{th}$ comparison result signals VOUT<1:N>. The first to $N^{th}$ counting units may count the first to $N^{th}$ comparison result signals VOUT<1:N>, and generate the first to $N^{th}$ digital signals DOUT<1:N> corresponding to the counting result. For example, the first counting unit may count a coarse clock (not illustrated) for a period before the first comparison result signal VOUT<1> is subjected to first zero crossing during the coarse conversion period, count a fine clock (not illustrated) for a period before the first comparison result signal VOUT<1> is subjected to second zero crossing during the fine conversion period, and generate the first digital signal DOUT<1> based on counting results.

Figure 5:
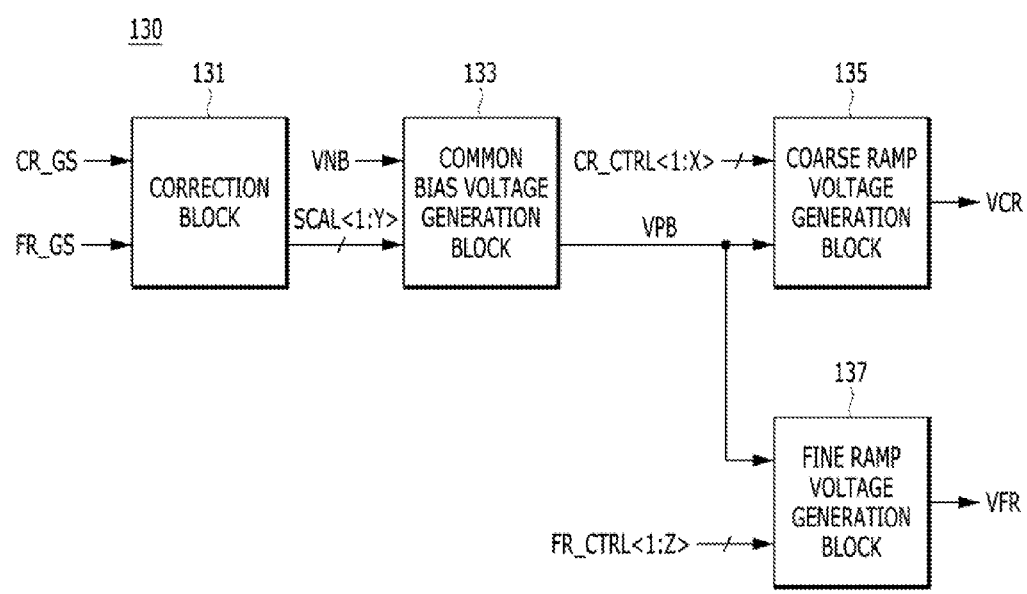
FIG. 5 is a detailed diagram of a ramp voltage generator shown in FIG. 3, according to an embodiment of the invention.

FIG. 5 is a detailed diagram of the ramp voltage generator 130 shown in FIG. 3, according to an embodiment of the invention.

Referring to FIG. 5, the ramp voltage generator 130 may include a correction block 131, a common bias voltage generation block 133, a coarse ramp voltage generation block 135, and a fine ramp voltage generation block 137.

The correction block 131 may generate first to $Y^{th}$ slope correction signals SCAL<1:Y> for each period during the coarse conversion period and the fine conversion period in response to the coarse conversion period signal CR_GS and the fine conversion period signal FR_GS. For example, the correction block 131 may generate the first to $Y^{th}$ slope correction signals SCAL<1:Y> previously set during the coarse conversion period based on the coarse conversion period signal CR_GS, and generate the first to $Y^{th}$ slope correction signals SCAL<1:Y> previously set during the fine conversion period based on the fine conversion period signal FR_GS.

The common bias voltage generation block 133 may generate a common bias voltage VPB based on the source bias voltage VNB and the first to $Y^{th}$ slope correction signals SCAL<1:Y>. For example, the common bias voltage generation block 133 may generate the common bias voltage VPB having a first voltage level based on the first to $Y^{th}$ slope correction signals SCAL<1:Y> inputted during the coarse conversion period, and generate the common bias voltage VPB having a second voltage level based on the first to $Y^{th}$ slope correction signals SCAL<1:Y> inputted during the fine conversion period.

The coarse ramp voltage generation block 135 may generate the coarse ramp voltage VCR in response to the common bias voltage VPB and the coarse ramp group control signals CR_CTRL<1:X>. For example, the coarse ramp voltage generation block 135 may generate the coarse ramp voltage VCR in response to the coarse clock during the coarse conversion period, where the voltage level of the coarse ramp voltage VCR drops by 128 LSB.

The fine ramp voltage generation block 137 may generate the fine ramp voltage VFR in response to the common bias voltage VPB and fine ramp group control signals FR_CTRL<1:Z>. For example, the fine ramp voltage generation block 137 may generate the fine ramp voltage VFR in response to the fine clock during the fine conversion period, where the voltage level of the fine ramp voltage VFR rises by 1 LSB.

Figure 6:
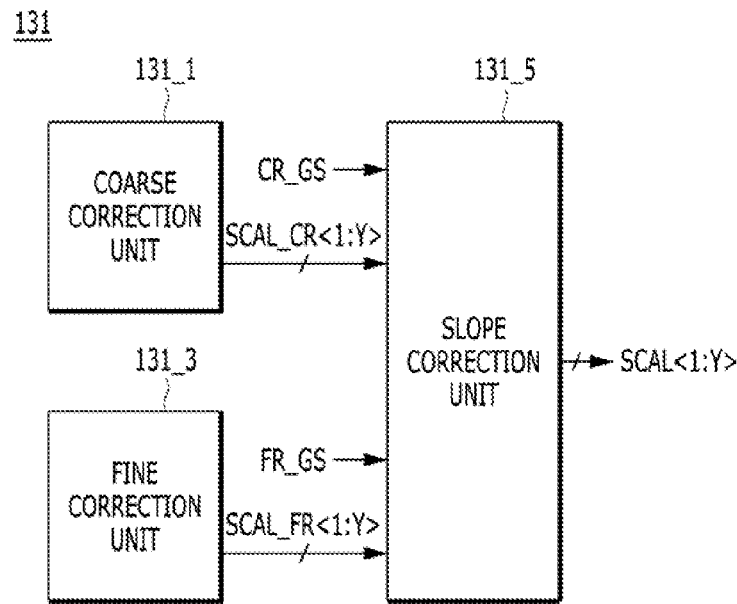
FIG. 6 is a detailed diagram of a correction block shown in FIG. 5, according to an embodiment of the invention.

FIG. 6 is a detailed diagram of the correction block 131 shown in FIG. 5 according to an embodiment of the invention.

Referring to FIG. 6, the correction block 131 may include a coarse correction unit 131_1, a fine correction unit 131_3, and a slope correction unit 131_5.

The coarse correction unit 131_1 may store first to $Y^{th}$ coarse correction signals SCAL_CR<1:Y> previously set. For example, the coarse correction unit 131_1 may include a register, a fuse circuit and the like. Hereinafter, the first to $Y^{th}$ coarse correction signals SCAL_CR<1:Y> are referred to as "coarse group correction signals SCAL_CR<1:Y>".

The fine correction unit 131_3 may store fine group correction signals SCAL_FR<1:Y> previously set. For example, the fine correction unit 131_3 may include a register, a fuse circuit and the like. Hereinafter, the first to $Y^{th}$ fine correction signals SCAL_FR<1:Y> are referred to as "fine group correction signals SCAL_FR<1:Y>".

The slope correction unit 131_5 may output the coarse group correction signals SCAL_CR<1:Y> or the fine group correction signals SCAL_FR<1:Y> as the first to $Y^{th}$ slope correction signals SCAL<1:Y> in response to the coarse conversion period signal CR_GS and the fine conversion period signal FR_GS. For example, the slope correction unit 131_5 may output the coarse group correction signals SCAL_CR<1:Y> as the first to $Y^{th}$ slope correction signals SCAL<1:Y> in response to the coarse conversion period signal CR_GS, or output the fine group correction signals SCAL_FR<1:Y> as the first to $Y^{th}$ slope correction signals SCAL<1:Y> in response to the fine conversion period signal FR_GS.

Figure 7:
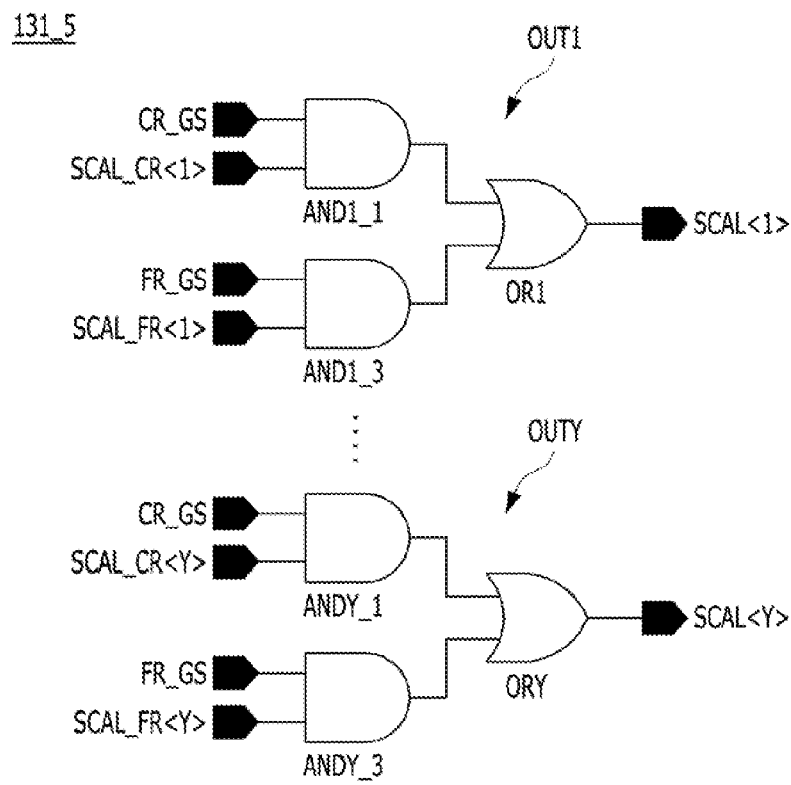
FIG. 7 is a detailed diagram of a slope correction unit shown in FIG. 6, according to an embodiment of the invention.

FIG. 7 is a detailed diagram of the slope correction unit 131_5 shown in FIG. 6, according to an embodiment of the invention.

Referring to FIG. 7, the slope correction unit 131_5 may include first to $Y^{th}$ logic combination sections OUT1 to OUTY.

The first logic combination section OUT1 may generate the first slope correction signal SCAL<1> in response to the coarse conversion period signal CR_GS, the fine conversion period signal FR_GS, the first coarse correction signal SCAL_CR<1> and the first fine correction signal SCAL_FR<1>. The $Y^{th}$ logic combination section OUTY may generate the $Y^{th}$ slope correction signal SCAL<Y> in response to the coarse conversion period signal CR_GS, the fine conversion period signal FR_GS, the $Y^{th}$ coarse correction signal SCAL_CR<Y> and the $Y^{th}$ fine correction signal SCAL_FR<Y>. Since the first to $Y^{th}$ logic combination sections OUT1 to OUTY may have the same structure, the first logic combination section OUT1 is representatively described below.

The first logic combination section OUT1 may output the first coarse correction signal SCAL_CR<1> as the first slope correction signal SCAL<1> in response to the coarse conversion period signal CR_GS, and output the first fine correction signal SCAL_FR<1> as the first slope correction signal SCAL<1> in response to the fine conversion period signal FR_GS.

For example, the first logic combination section OUT1 may include a first AND gate AND1_1, a second AND gate AND1_3, and a first OR gate OR1. The first AND gate AND1_1 may generate a first coarse logic signal by performing an AND operation on the coarse conversion period signal CR_GS and the first coarse correction signal SCAL_CR<1>. The second AND gate AND1_3 may generate a first fine logic signal by performing an AND operation on the fine conversion period signal FR_GS and the first fine correction signal SCAL_FR<1>. The first OR gate OR1 may generate the first slope correction signal SCAL<1> by performing an OR operation on the first coarse logic signal and the first fine logic signal.

Figure 8:
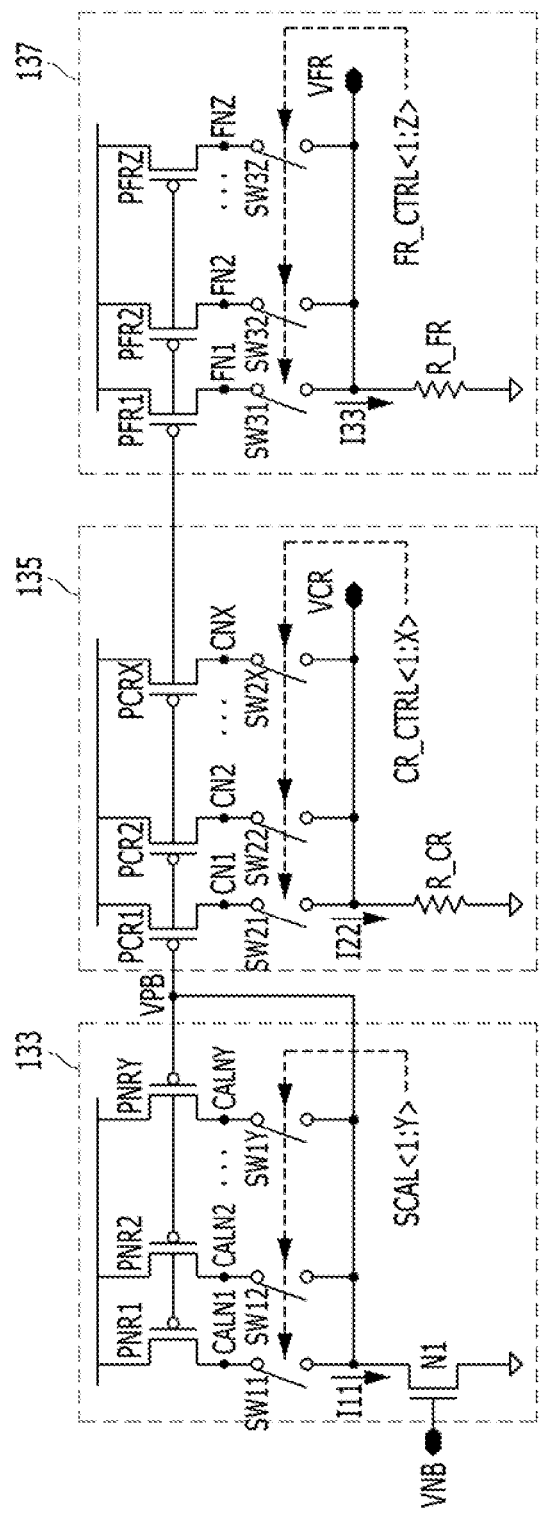
FIG. 8 is a detailed diagram of a common bias voltage generation block, a coarse ramp voltage generation block, and a fine ramp voltage generation block shown in FIG. 5, according to an embodiment of the invention.

FIG. 8 is a detailed diagram of the common bias voltage generation block 133, the coarse ramp voltage generation block 135, and the fine ramp voltage generation block 137 shown in FIG. 5.

Referring to FIG. 8, the common bias voltage generation block 133 may include a sinking section N1, first sourcing sections PNR1 to PNRY, and first switching sections SW11 to SW1Y.

The sinking section N1 may be coupled between an output terminal of the common bias voltage VPB and a ground voltage terminal, and may sink a first source current I11 in response to the source bias voltage VNB. For example, the sinking section N1 may include a NMOS transistor having a gate coupled to an input terminal of the source bias voltage VNB, and a drain and a source coupled between the output terminal of the common bias voltage VPB and the ground voltage terminal.

The first sourcing sections PNR1 to PNRY may be coupled between a power supply voltage terminal and first to $Y^{th}$ sourcing nodes CALN1 to CALNY, and may source the source current I11 in response to the common bias voltage VPB. For example, the first sourcing section PNR1 may include first to $Y^{th}$ PMOS transistors respectively having gates coupled to the output terminal of the common bias voltage VPB, and sources and drains coupled between the power supply voltage terminal and the first to $Y^{th}$ sourcing nodes CALN1 to CALNY.

The first switching sections SW11 to SW1Y may be coupled between the first to $Y^{th}$ sourcing nodes CALN1 to CALNY and the output terminal of the common bias voltage VPB, and transmit the first source current I11 previously set during the coarse conversion period and the fine conversion period based on the first to $Y^{th}$ slope correction signals SCAL<1:Y>. For example, the first switching sections SW11 to SW1Y may include first to $Y^{th}$ switching elements for selectively coupling the first to $Y^{th}$ sourcing nodes CALN1 to CALNY to the output terminal of the common bias voltage VPB in response to the first to $Y^{th}$ slope correction signals SCAL<1:Y>.

The coarse ramp voltage generation block 135 may include first mirroring sections PCR1 to PCRX, second switching sections SW21 to SW2X, and a first resistor section R_CR.

The first mirroring sections PCR1 to PCRX may be coupled between the power supply voltage terminal and first to $X^{th}$ mirroring nodes CN1 to CNX, and source a first mirror current I22 based on the common bias voltage VPB. For example, the first mirroring sections PCR1 to PCRX may include first to $X^{th}$ PMOS transistors respectively having gates coupled to an input terminal of the common bias voltage VPB and sources and drains coupled between the power supply voltage terminal and the first to $X^{th}$ mirroring nodes CN1 to CNX.

The second switching sections SW21 to SW2X may be coupled between the first to $X^{th}$ mirroring nodes CN1 to CNX and an output terminal of the coarse ramp voltage VCR, and transmit the first mirror current I22 decreased by a coarse operating unit during the coarse conversion period in response to the coarse ramp group control signals CR_CTRL<1:X>. For example, the second switching sections SW21 to SW2X may include first to $X^{th}$ switching elements which are sequentially open during the coarse conversion period in response to the coarse ramp group control signals CR_CTRL<1:X>.

The first resistor section R_CR may be coupled between the output terminal of the coarse ramp voltage VCR and the ground voltage terminal. For example, the first resistor section R_CR may include a resistance element.

The fine ramp voltage generation block 137 may include second mirroring sections PFR1 to PFRZ, third switching sections SW31 to SW3Z, and a second resistor section R_FR.

The second mirroring sections PFR1 to PFRZ may be coupled between the power supply voltage terminal and first to $Z^{th}$ mirroring nodes FN1 to FNZ, and source a second mirror current I33 based on the common bias voltage VPB. For example, the second mirroring sections PFR1 to PFRZ may include first to $Z^{th}$ PMOS transistors respectively having gates coupled to the input terminal of the common bias voltage VPB and sources and drains coupled between the power supply voltage terminal and the first to $Z^{th}$ mirroring nodes FN1 to FNZ.

The third switching sections SW31 to SW3Z may be coupled between the first to $Z^{th}$ mirroring nodes FN1 to FNZ and an output terminal of the fine ramp voltage VFR, and transmit the second mirror current I33 increased by a fine operating unit during the fine conversion period in response to the fine ramp group control signals FR_CTRL<1:Z>. For example, the third switching sections SW31 to SW3Z may include first to $Z^{th}$ switching elements which are sequentially closed during the fine conversion period in response to the fine ramp group control signals FR_CTRL<1:Z>.

The second resistor section R_FR may be coupled between the output terminal of the fine ramp voltage VFR and the ground voltage terminal. For example, the second resistor section R_FR may include a resistance element.

Hereinafter, an operation of the image sensing device 100 having the aforementioned structure according to the embodiment of the present invention is described.

In the embodiment of the present invention, the general operation of the image sensing device 100 for the first pixel signal VPX<1> is described with reference to FIGS. 9 and 10.

Figure 9:
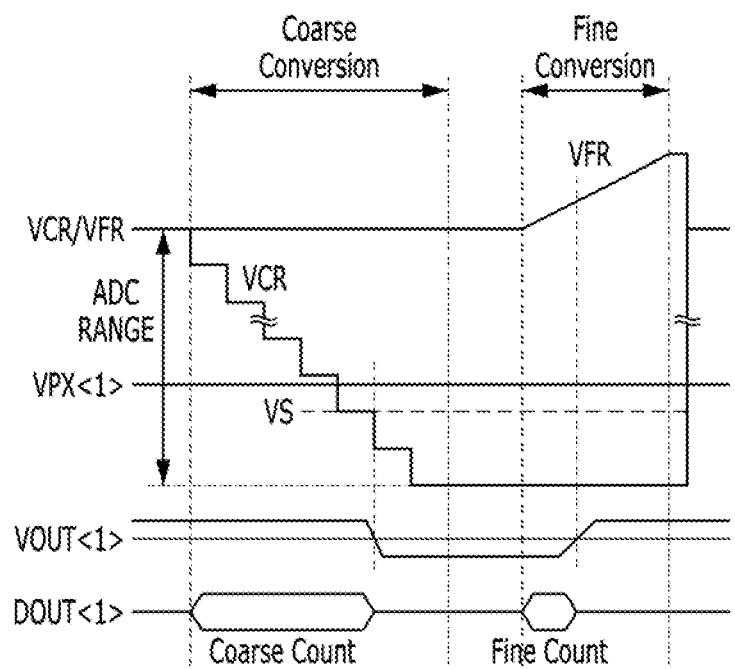
FIG. 9 is a timing diagram describing an operation of the image sensing device shown in FIG. 3, according to an embodiment of the invention.

FIG. 9 is a timing diagram for describing an operation of the image sensing device 100 shown in FIG. 3, according to an embodiment of the invention.

The coarse group correction signals SCAL_CR<1:Y> corresponding to the coarse conversion period and the fine group correction signals SCAL_FR<1:Y> corresponding to the fine conversion period may be set in advance in the correction block 131. For example, the slope of the coarse ramp voltage VCR and the slope of the fine ramp voltage VFR may be measured through a test or a simulation, and the coarse group correction signals SCAL_CR<1:Y> and the fine group correction signals SCAL_FR<1:Y> corresponding to the measurement result may be set in advance in the correction block 131.

In such a state, referring to FIG. 9, the analog-to-digital converter 120 may measure a voltage level of the first pixel signal VPX<1> outputted from the pixel array 110 based on the coarse ramp voltage VCR during the coarse conversion period, and generate the first digital signal DOUT<1> corresponding to the measurement result. For example, the comparison block 121 may compare the voltage level of the first pixel signal VPX<1> with the coarse ramp voltage VCR having a voltage level dropping by the coarse operating unit, for example, corresponding to 128 LSB, and transition the first comparison result signal VOUT<1> to a first logic level when the voltage level of the coarse ramp voltage VCR is lower than the voltage level of the first pixel signal VPX<1> as a result of the comparison. Furthermore, the counter block 123 may count a coarse clock (not Illustrated) for a period before the first comparison result signal VOUT<1> transitions during the coarse conversion period, and generate a count code of 3 bits corresponding to the counting result as the first digital signal DOUT<1>.

Subsequently, the analog-to-digital converter 120 may measure the voltage level of the first pixel signal VPX<1> based on the fine ramp voltage VFR during the fine conversion period, and generate the first digital signal DOUT<1> corresponding to the measurement result. For example, the comparison block 121 may compare the voltage level of the first pixel signal VPX<1> with the fine ramp voltage VFR having a voltage level rising by the fine operating unit, for example, corresponding to 1 LSB, and transition the first comparison result signal VOUT<1> to a second logic level when the voltage level of the fine ramp voltage VFR is higher than the voltage level of the first pixel signal VPX<1> as a result of the comparison. Although not illustrated, the comparison block 121 may store the level VS of the coarse ramp voltage VCR when it is lower than the voltage level of the first pixel signal VPX<1> in the coarse conversion period, and compare the fine ramp voltage VFR rising by the fine operating unit from the level VS with the voltage level of the first pixel signal VPX<1>. Furthermore, the counter block 123 may count a fine clock (not illustrated) for a period before the first comparison result signal VOUT<1> transitions during the fine conversion period, and generate a count code of 7 bits corresponding to the counting result as the first digital signal DOUT<1>.

The ramp voltage generator 130 may generate the coarse ramp voltage VCR having a voltage level dropping by the coarse operating unit, which has a predetermined slope, in response to the coarse conversion period signal CR_GS and the coarse ramp group control signals CR_CTRL<1:X> during the coarse conversion period. To be specific, the correction block 131 may generate the coarse group correction signals SCAL_CR<1:Y> previously set corresponding to the coarse conversion period as the first to $Y^{th}$ slope correction signals SCAL<1:Y> based on the coarse conversion period signal CR_GS, and the common bias voltage generation block 133 may generate the common bias voltage VPB having the first voltage level based on the source bias voltage VNB and the first to $Y^{th}$ slope correction signals SCAL<1:Y>, and the coarse ramp voltage generation block 135 may generate the coarse ramp voltage VCR based on the common bias voltage VPB and the coarse ramp group control signals CR_CTRL<1:X>.

The ramp voltage generator 130 may generate the fine ramp voltage VFR having a voltage level rising by the fine operating unit, which has the predetermined slope, in response to the fine ramp group control signals FR_CTRL<1:Z> during the fine conversion period. To be specific, the correction block 131 may generate the fine group correction signals SCAL_FR<1:Y> previously set corresponding to the fine conversion period as the first to $Y^{th}$ slope correction signals SCAL<1:Y> based on the fine conversion period signal FR_GS, and the common bias voltage generation block 133 may generate the common bias voltage VPB having the second voltage level based on the source bias voltage VNB and the first to $Y^{th}$ slope correction signals SCAL<1:Y>, and the fine ramp voltage generation block 137 may generate the fine ramp voltage VFR based on the common bias voltage VPB and the fine ramp group control signals FR_CTRL<1:Z>.

The first voltage level and the second voltage level may be equal to or different from each other based on degree of correction of the slope.

Figure 10A:
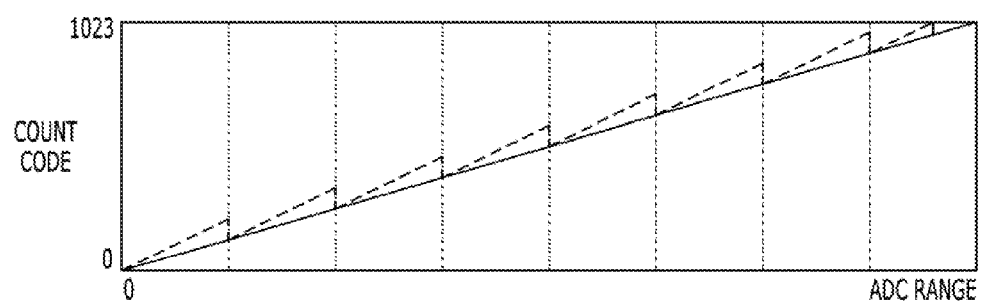
FIGS. 10A and 10B are graphs describing an operation of the ramp voltage generator shown in FIG. 5, according to an embodiment of the invention.
Figure 10B:
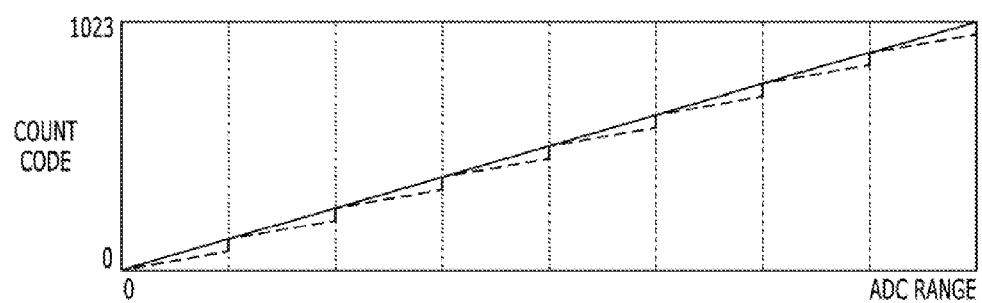

FIGS. 10A and 10B are graphs describing an operation of the ramp voltage generator 130 shown in FIG. 5. More specifically, FIGS. 10A and 10B show how the linearity of digital signals (for example, DOUT<1>) outputted from the analog-to-digital converter 120 may be improved as the slope of at least one of the coarse ramp voltage VCR and the fine ramp voltage VFR is corrected. FIG. 10A shows a case where the slope of the coarse ramp voltage VCR is in a normal state where a correction is not necessary, and the slope of the fine ramp voltage VFR is higher than the slope of the coarse ramp voltage VCR. FIG. 10B shows a case where the slope of the coarse ramp voltage VCR is in a normal state where a correction is not necessary, and the slope of the fine ramp voltage VFR is lower than the slope of the coarse ramp voltage VCR.

As Illustrated in FIG. 10A, when the slope of the fine ramp voltage VFR is higher than the slope of the coarse ramp voltage VCR, the number of switching elements which are closed among the first to $Y^{th}$ switching elements is increased, so that the voltage level of the common bias voltage VPB may be adjusted to an increased value. Thus, a unit current amount (corresponding to an amount of current flowing through each the first to $Z^{th}$ mirroring nodes FN1 to FNZ) of the second mirror current I33 is reduced, so that the slope of the fine ramp voltage VFR may be adjusted to a lower value.

As illustrated in FIG. 10B, when the slope of the fine ramp voltage VFR is lower than the slope of the coarse ramp voltage VCR, the number of switching elements which are open among the first to $Y^{th}$ switching elements is increased, so that the voltage level of the common bias voltage VPB may be adjusted to drop. Thus, the unit current amount of the second mirror current I33 is increased, so that the slope of the fine ramp voltage VFR may be adjusted to a high value.

According to embodiments of the present invention as described above, the voltage level of the common bias voltage VPB required for generating the coarse ramp voltage VCR and the fine ramp voltage VFR may be controlled for each period, and the slope of the coarse ramp voltage VCR and the slope of the fine ramp voltage VFR may be identical for compensating for a mismatch between the coarse and the fine ramp voltages VCR and VFR.

Consequently, according to embodiments of the present invention as described above, a mismatch between the coarse and the fine ramp voltages may be corrected so that the linearity of the slope of the coarse ramp voltage or the slope of the fine ramp voltage may be improved.

In addition, when an analog signal is converted into a digital signal, the digital signal corresponding to a normal code is generated so that the performance of an image sensing device may be improved.

While the present invention has been described with respect to specific embodiments, the embodiments are not intended to be restrictive, but rather descriptive of the invention. Further, it is noted that the present invention may be achieved in various ways through substitution, change, and modification, by those skilled in the art without departing from the spirit and or scope of the present invention as defined by the following claims.

In the embodiments of the present invention, an image sensing device has been described as an example; however, the present invention is not limited thereto, and the present invention can be applied to all devices and circuits using a coarse ramp voltage and a fine ramp voltage.

What is claimed is:

1. A ramp voltage generator, comprising:
   a correction block suitable for generating a slope correction signal for first and second periods based on a period signal for distinguishing the periods;
   a common bias voltage generation block suitable for generating a common bias voltage based on the slope correction signal and a source bias voltage;
   a first ramp voltage generation block suitable for generating a first ramp voltage having a predetermined slope during the first period based on the common bias voltage and a first ramp group control signal; and
   a second ramp voltage generation block suitable for generating a second ramp voltage having the predetermined slope during the second period based on the common bias voltage and a second ramp group control signal.

2. The ramp voltage generator of claim 1, wherein the correction block includes:
   first and second correction units suitable for storing first and second group correction signals, respectively; and
   a slope correction unit suitable for outputting the first group correction signal or the second group correction signal as the slope correction signal based on the period signal.

3. The ramp voltage generator of claim 1, wherein the common bias voltage generation block includes:
   a sinking section coupled between an output terminal of the common bias voltage and a low voltage terminal, and suitable for sinking a first source current based on the source bias voltage;
   a plurality of second sourcing sections coupled between a high voltage terminal and a plurality of first sourcing nodes, respectively, and suitable for sourcing the first source current based on the common bias voltage; and
   a plurality of second switching sections coupled between the respective first sourcing nodes and the output terminal of the common bias voltage, and suitable for selectively switching based on the slope correction signal.

4. An image sensing device, comprising:
   a pixel array suitable for generating a plurality of pixel signals;
   an analog-to-digital converter suitable for generating a plurality of digital signals corresponding to the plurality of pixel signals based on a coarse ramp voltage and a fine ramp voltage; and
   a ramp voltage generator suitable for generating the coarse ramp voltage during a coarse conversion period and the fine ramp voltage during a fine conversion period based on a coarse conversion period signal, a fine conversion period signal, a source bias voltage, a coarse ramp group control signal, and a fine ramp group control signal, and for correcting at least one of a slope of the coarse ramp voltage and a slope of the fine ramp voltage,
   wherein the analog-to-digital converter includes:
   a plurality of comparison units suitable for comparing respective pixel signals with the coarse ramp voltage during the coarse conversion period, and comparing the respective pixel signals with the fine ramp voltage during the fine conversion period, and
   wherein the ramp voltage generator includes:
   a common bias voltage generation block suitable for generating a common bias voltage based on a slope correction signal and a source bias voltage;
   a coarse ramp voltage generation block suitable for generating the coarse ramp voltage having a predetermined slope during the coarse conversion period based on the common bias voltage and a coarse ramp group control signal; and
   a fine ramp voltage generation block suitable for generating the fine ramp voltage having the predetermined slope during the fine conversion period based on the common bias voltage and a fine ramp group control signal.

5. The image sensing device of claim 4, wherein the ramp voltage generator further includes:
   a correction block suitable for generating the slope correction signal previously set for each of the coarse and fine conversion periods, based on the coarse conversion period signal and the fine conversion period signal.

6. The image sensing device of claim 5, wherein the correction block includes:
   a coarse correction unit suitable for storing a coarse group correction signal;
   a fine correction unit suitable for storing a fine group correction signal; and
   a slope correction unit suitable for outputting the coarse group correction signal or the fine group correction signal as the slope correction signal based on the coarse conversion period signal and the fine conversion period signal.

7. The image sensing device of claim 4, wherein the common bias voltage generation block includes:
   a sinking section coupled between an output terminal of the common bias voltage and a low voltage terminal, and suitable for sinking a first source current based on the source bias voltage;
   a plurality of second sourcing sections coupled between a high voltage terminal and a plurality of first sourcing nodes, respectively, and suitable for sourcing the first source current based on the common bias voltage; and
   a plurality of second switching sections coupled between the respective first sourcing nodes and the output terminal of the common bias voltage, and suitable for selectively switching based on the slope correction signal.

8. A method for driving an image sensing device, comprising:

setting a coarse correction group signal corresponding to a coarse conversion period and a fine correction group signal corresponding to a fine conversion period so that at least one of a slope of a coarse ramp voltage and a slope of a fine ramp voltage is corrected;

generating a common bias voltage having a first voltage level based on the coarse correction group signal and a source bias voltage during the coarse conversion period, and generating the coarse ramp voltage having a predetermined slope based on the common bias voltage having the first voltage level; and generating the common bias voltage having a second voltage level based on the fine correction group signal and the source bias voltage during the fine conversion period, and generating the fine ramp voltage having the predetermined slope based on the common bias voltage having the second voltage level.

9. The method of claim 8, wherein the setting of the coarse correction group signal and the fine correction group signal includes storing the coarse correction group signal and the fine correction group signal previously set through a test or a simulation.

10. The method of claim 8, wherein the first voltage level and the second voltage level are identical to each other.

11. The method of claim 8, wherein the first voltage level and the second voltage level are different from each other.

* * * * *